United States Patent [19]
Akasu

[11] Patent Number: 4,633,835
[45] Date of Patent: Jan. 6, 1987

[54] IGNITION TIMING CONTROL APPARATUS FOR ENGINE

[75] Inventor: Masahira Akasu, Hyogo, Japan

[73] Assignee: Mitsubishi Denki Kabushiki Kaisha, Japan

[21] Appl. No.: 834,125

[22] Filed: Feb. 26, 1986

Related U.S. Application Data

[63] Continuation of Ser. No. 616,418, Jun. 1, 1984, abandoned.

[30] Foreign Application Priority Data

Jun. 3, 1983 [JP] Japan .................................. 58-99683
Jun. 3, 1983 [JP] Japan .................................. 58-99682

[51] Int. Cl.⁴ .............................................. F02P 5/15
[52] U.S. Cl. .................................................. 123/425
[58] Field of Search ............................. 123/425, 435; 364/431.08

[56] References Cited

U.S. PATENT DOCUMENTS 4,276,861 7/1981 Kearney et al. ..................... 123/425
4,320,729 3/1982 Sawada et al. ...................... 123/425
4,328,779 5/1982 Hattori et al. ................. 123/425 X
4,357,919 11/1982 Hattori et al. ....................... 123/425
4,527,526 7/1985 Akasu ................................. 123/425

FOREIGN PATENT DOCUMENTS 176362 10/1982 Japan .................................. 123/425

Primary Examiner—Tony M. Argenbright
Attorney, Agent, or Firm—Bernard, Rothwell & Brown

[57] ABSTRACT

An apparatus for controlling the timing of ignition in an engine by delaying, upon detection of knocking in the engine, a reference ignition timing preset in accordance with each running mode of the engine. The apparatus is equipped with abnormality detecting means which functions in response to any fault or malfunction of knock detecting means and prevents alteration of the ignition timing in the direction of angular advance.

6 Claims, 4 Drawing Figures

IGNITION TIMING CONTROL APPARATUS FOR ENGINE

This is a continuation of application Ser. No. 616,418 filed June 1, 1984, now abandoned.

BACKGROUND OF THE INVENTION

1. Field of the Invention

The present invention relates to an apparatus for controlling the timing of ignition in an internal combustion engine through detection of knocking induced therein.

2. Description of the Prior Art

In the conventional apparatus of this type known heretofore, it is generally customary to execute a control action through a feedback system where an ignition signal produced at a timing determined on the basis of preset reference ignition timing characteristic is phase-shifted by a fixed angle upon induction of knocking or by a delay angle corresponding to the intensity of knocking and, in case no knock is existent, the amount of such delay-angle phase shift is reduced with a predetermined time constant to control the ignition timing.

In such a control action, however, it is necessary to preset the reference ignition timing ahead of a knock threshold point since the knock suppression control is performed by the use of an angular delay from the reference ignition timing. Therefore, the ignition timing at the control start point is always beyond the knock threshold point, whereby induction of great-intensity knocking is unavoidable. Also in case there occurs any change in the engine running mode, the feedback control quantity related to the previous running mode anterior to such change is applied continuously even after the change, so that a considerable time lag comes to be existent until the control quantity is settled at a desired value which conforms to the post-change running mode. Consequently, the response to a change in the running mode is rendered unsatisfactory. Furthermore, since the controller needs to cover the entire running conditions for knock suppression with the individual feedback control quantities, a wide dynamic range is required and thus it has been difficult heretofore to achieve accurate ignition timing in the entire running conditions.

Induction of knocking is dependent on the performance characteristics of an engine including various factors such as ignition timing, air-to-fuel ratio, suction temperature and suction air humidity. Out of the above factors, those relative to natural phenomena such as temperature and humidity of suction air are in a relatively long variation cycle with respect to the lapse of time like a day or a season, for example. Therefore, generation of knocking derived from any change in such factors also has a long variation cycle. In other words, knocks induced within a short period of time in one engine running mode are substantially the same, and there exists almost no difference among them with respect to the induction frequency or the intensity. That is, the corrective control value required for suppressing the knocks induced in one running mode are substantially the same within a short period of time. Therefore, in one running mode of an engine prescribed by particular running parameters, the corrective control value stored previously is usable as a value for the present stage and, since the ignition timing correction range may be narrow with regard to generation of slight knocking during the control action, high-precision knocking suppression is achievable with an extremely rapid response by executing sequential correction control in response to a knock detection signal at each time of the generation. Moreover, for any change occurring in the aforementioned long-cycle factor, the corrective control value may be altered slowly to carry out the desired correction.

However, if any abnormality such as fault or malfunction is caused, during the running of the engine, in a sensor or an electric circuit provided for detecting the engine vibration, knocking is not detectable and consequently the ignition timing is renewed under control in the direction of angular advance. As a result, the ignition timing fails to be delayed properly at the induction of knocking, hence bringing about the possibility of causing premature ignitions in succession.

SUMMARY OF THE INVENTION

It is an object of the present invention to provide an improved ignition timing control apparatus designed for use in an internal combustion engine and capable of solving the problems in the conventional apparatus by controlling the ignition timing in accordance with the aforementioned characteristics relative to induction of knocking.

And another object of the invention resides in providing an ignition timing control apparatus which is adapted to realize safe running of the engine in spite of occurrence of any abnormality in knock detecting means.

Fundamentally, the ignition timing control apparatus according to this invention comprises memory means capable of storing corrective control values conforming to individual running modes of the engine and, in response to input information representative of one running mode, outputting the corrective control values corresponding to such information; renewal control means for renewing the corrective control value corresponding to the running mode at that moment in response to the output of the knock detecting means so that the control value is renewed in the direction of angular advance for ignition upon detection of no knocking and in the direction of angular delay for ignition upon detection of knocking; and abnormality detecting means responsive to detection of any abnormality in the knock detecting means and serving to prohibit renewal of the corrective control value stored in the memory means. In this arrangement, it becomes possible to eliminate the known disadvantage that, upon occurrence of any abnormality in the knock detecting means, the corrective control value is renewed in the direction of angular advance as a result of failure in detecting generation of knocking.

DETAILED DESCRIPTION OF THE PREFERRED EMBODIMENTS

Figure 1:
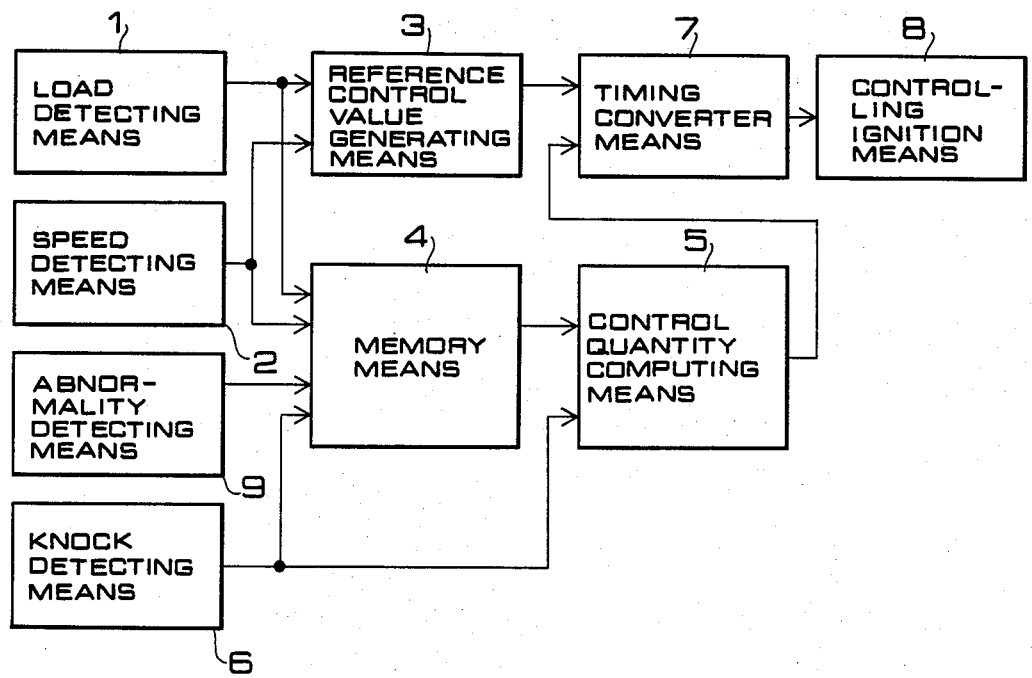
FIG. 1 is a block diagram showing the principle of the present invention.

The block diagram of FIG. 1 shows the principle of an ignition timing control apparatus according to this invention, wherein reference control value generating means 3 is responsive to an engine load state detected by load detecting means 1 and also to an engine speed detected by speed detecting means 2, and generates a reference control value to set a reference ignition timing which corresponds to the engine running mode at that moment. In memory means 4, corrective control values predetermined in accordance with individual load states and rotational speeds of the engine are stored at two-dimensionally arrayed addresses. And out of such corrective control values stored, one corresponding to the input information representative of the running mode is fed to control quantity computing means 5, which then computes both the corrective control value received and a knocking signal from knock detecting means 6, thereby producing a control quantity for correction of the ignition timing. Timing converter means 7 determines the ignition timing in accordance with the corrective control quantity obtained from the computing means 5 and the reference control value for setting the reference ignition timing, and generates a timing signal at the moment corresponding to the ignition timing thus determined, thereby controlling ignition means 8. The aforesaid memory means 4 renews the corrective control value in accordance with the presence or absence of the output signal of the knock detecting means. And abnormality detecting means 9 detects occurrence of any abnormality such as fault in the knock detecting means 6 and halts the action of renewing the corrective control value in the memory means 4.

Figure 2:
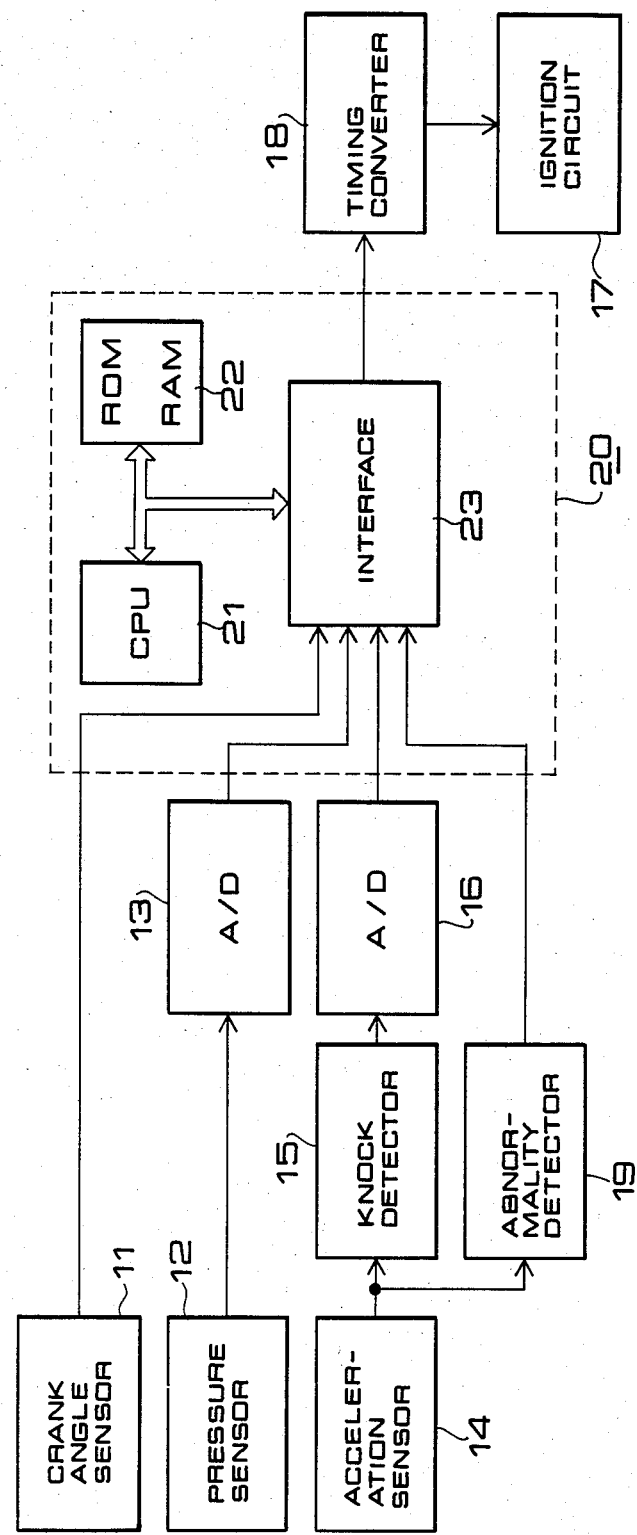
FIG. 2 is a block diagram of an exemplary ignition timing control apparatus embodying the invention.

FIG. 2 is a concrete block diagram of an exemplary apparatus embodying the present invention, wherein there are shown a crank angle sensor 11 for generating a reference crank angle signal in accordance with the rotation of an engine; a pressure sensor 12 for detecting a suction pipe pressure in the engine and producing a pressure signal proportional to the detected pressure; a first A/D converter 13 for digitizing the output signal of the pressure sensor 12 in accordance with its level; and acceleration sensor 14 attached to the engine and serving to detect the acceleration of the engine vibration; a knock detector 15 for discriminating from the output of the acceleration sensor 14 the knocking component generated due to knocking of the engine and producing a knocking signal of a level proportional to the intensity of the knocking; a second A/D converter 16 for digitizing the output signal of the knock detector 15; an abnormality detector 19 for detecting occurrence of any abnormality in the knock detector from the noise level of the output of the acceleration sensor 14; and a microcomputer 20 principally comprising a microprocessor 21, a memory 22 and an interface 23. Further shown are an ignition circuit 17 controlled by the microcomputer 20, and a timing converter 18.

The operation of the above embodiment having such constitution will now be described below. The crank angle sensor 11 detects the rotational angular position of the engine at a rate of once per ignition cycle during the engine rotation and produces an output pulse representing the reference crank angle, which is then fed to the interface 23 in the microcomputer 20. The pressure sensor 12 detects the suction pipe pressure in the engine and produces a pressure signal of a level corresponding to the detected pressure. Since the suction pipe pressure in the engine varies sharply in conformity with the engine load state, it is possible to find such load state from the level of the pressure signal obtained through detection of the suction pipe pressure. The pressure signal produced from the sensor 12 is digitized by the first A/D converter 13 and then is fed to the interface 23. Meanwhile, the acceleration sensor 14 is attached to the engine to detect the engine vibration continuously. The detection output of the sensor 14 includes a noise signal representative of mechanical noise resulting from the engine operation and also a knocking component resulting from the vibration caused by knocks. The knock detector 15 discriminates the knocking component from the detection output of the acceleration sensor 14 and produces a knocking signal of a level proportional to the knocking intensity. The knocking signal thus obtained is digitized by the second A/D converter 16 and then is fed to the interface 23. The knock detector 15 is reset by the interface 23 in response to a command from the microprocessor 21 and is thereby initialized for detection of knocking.

The memory 22 in the microcomputer 20 includes ROM and RAM. The ROM has an angular advance map to store, in addresses predetermined correspondingly to the rotational speeds and load states of the engine, reference control values for setting reference advance angles for ignition in individual running modes of the engine; and the RAM has a learning map to store, in addresses predetermined correspondingly to the rotational speeds and load states of the engine, corrective control values calculated according to the output of the knock detector 15 in individual running modes of the engine. The microcomputer 20 establishes an optimal ignition timing by computing the ignition-timing corrective control quantity on the basis of the information obtained from the aforesaid crank angle sensor 11, pressure sensor 12 and acceleration sensor 14, and ignites the engine by interrupting energization of an ignition coil in the ignition circuit 17 via the timing converter 18 which generates a timing signal at the ignition timing established. When the engine running mode satisfies the following two conditions, for example, the microcomputer 20 starts its procedure of renewing the corrective control value for knock suppression.

Condition 1: The engine speed variation from the renewal start point is less than 50 rpm.

Condition 2: The engine load variation from the renewal start point is less than 5%.

If knocking is induced in such running state that the above conditions 1 and 2 are satisfied over 100 ignition cycles in succession and then sequential correction is executed for knock suppression, the sequential correction value is added to the corrective control value to obtain a renewed corrective control value. In case the sequential correction quantity is zero or no knock is induced at all during this period, one unitary quantity is subtracted from the corrective control value to obtain a renewed corrective control value, which is subsequently stored in the learning map area corresponding to the present engine running mode. After renewal of the corrective control value for knock suppression, a sequential control action is performed on the basis of the corrective control value thus renewed. That is, renewal of the corrective control value is carried out in such a manner as to minimize the sequential correction, thereby executing ignition at an optimal timing.

Supposing now that one engine running mode has transferred to another, the corrective control value stored in the learning map is not renewed in the transient state of the engine running mode according to the aforesaid conditions 1 and 2. Consequently, the sequential correction value established due to the knocking induced during transition of the engine running mode is not used for renewal of the corrective control value, thereby preventing storage of insignificant information (which does not represent the running mode at that moment). Furthermore, for knock suppression control during and after a change of the engine running mode, the stored corrective control value is read out from the learning map area corresponding to the running mode at that moment, and sequential correction for knock suppression is started on the basis of the corrective control value thus read out. That is, differing from the operation of the conventional apparatus, control is not commenced from the knock-suppression control quantity selected anterior to a change of the running mode, and it is possible to immediately assume a desired control state relative to the corrective control value already obtained, whereby remarkable improvement is achievable in the response characteristic with regard to knock suppression control.

Meanwhile, the abnormality detector 19 keeps monitoring the output of the acceleration sensor 14. As mentioned previously, the output of the acceleration sensor 14 includes mechanical noise generated in the engine. If there occurs any abnormality such as fault or malfunction of the acceleration sensor 14, disconnection of its output leadwire or short-circuiting trouble, the output of the acceleration sensor 14 is reduced to zero and therefore none of the mechanical noise is inputted to the abnormality detector 19, which then produces an abnormality signal in accordance with the input noise level and sends the signal to the interface 23. In response to the abnormality signal, the microcomputer 20 halts its aforesaid procedure of renewing the corrective control quantity, so that even when detection of knocking is rendered impossible due to occurrence of any abnormality in the knock detector, renewal of the corrective control quantity in the direction of angular advance is brought to a halt to prevent premature ignition, thereby eliminating harmful influence that may otherwise be exerted on the engine by premature ignition and eventually ensuring safety in the running of the engine.

Figure 3:
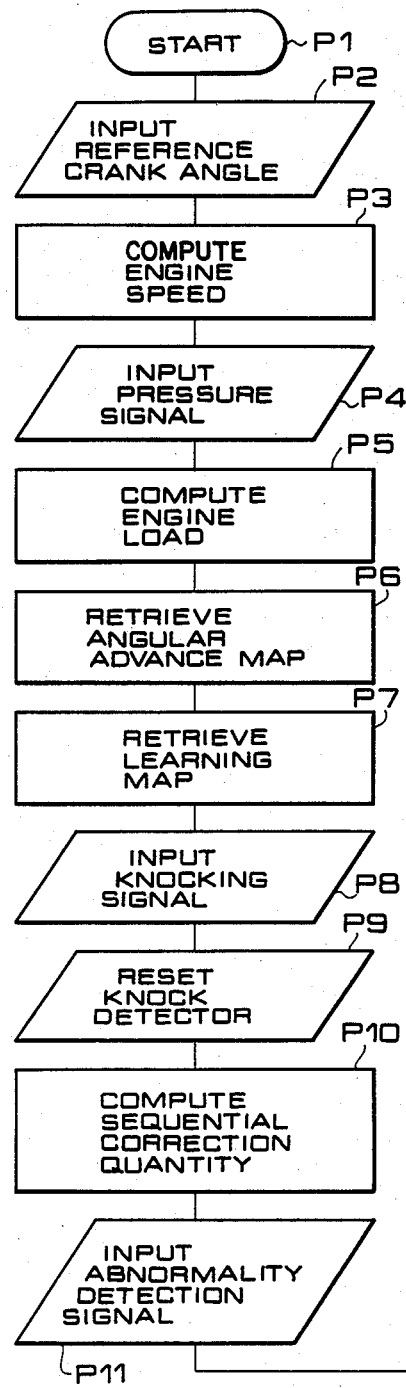
FIG. 3 is a flowchart representing the control operation of the apparatus shown in FIG. 2.
Figure 3:
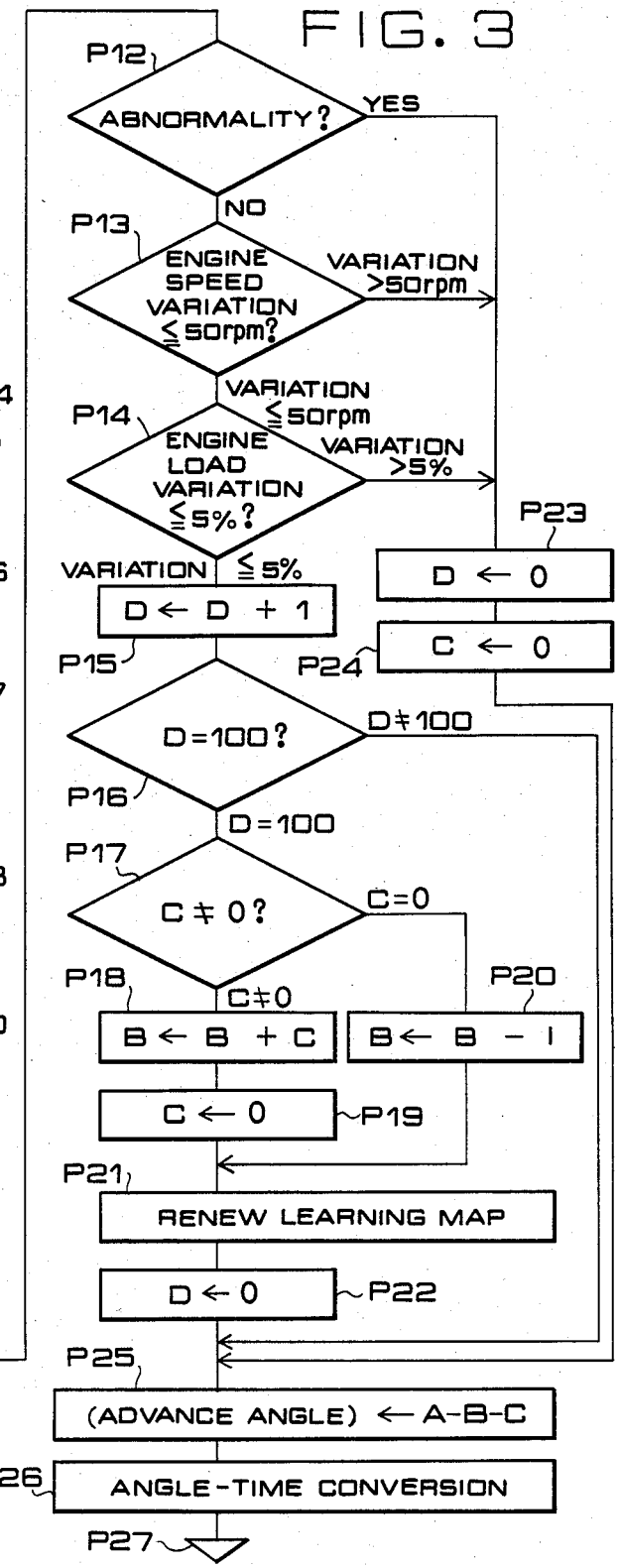

FIG. 3 shows a flowchart for performing the above-described control action, wherein P1 through P26 denote a sequence of individual steps. Control computation is executed at a rate of, e.g. once per ignition cycle in response to each input reference crank angle pulse. First, a reference crank angle pulse is inputted in step P2, and the period from the preceding reference crank angle pulse is converted into a rotational speed of the engine in step P3. A pressure signal is inputted in step P4, and a load state of the engine is calculated in step P5. In the next step P6, reference control values corresponding to the rotational speed and the load state of the engine calculated respectively in steps P3 and P5 are retrieved from the angular advance map and then are stored in a register A. In step P7, as in the preceding step P6, corrective control quantities for knock suppression corresponding to the rotational speed and the load state are retrieved from the learning map and then are stored in a register B. Subsequently a knock signal is inputted in step P8, and a signal for resetting the knock detector 15 is produced in step P9, so as to be ready for detecting induction of next knocking. In step P10, a control quantity corresponding to the level of the knock signal inputted in step P8 is calculated and added to the preceding sequential correction value already stored in a register C, and the combined signal is stored therein again. The output signal of the abnormality detector 19 is inputted in step P11, and a check is executed in step P12 to ascertain whether any abnormality is existent or not in the knock detector. In case any abnormality is existent, the value in a register D is cleared to zero in step P23, and the sequential correction quantity stored in the register C is also cleared to zero in step P24. Then the process jumps to step P25 without renewal of the corrective control value. The register D serves to count the number of ignitions to determine the renewal time for the corrective control value. In case no abnormality is existent in the knock detector, a check is executed in steps P13 and P14 to ascertain whether the rotational speed variation is less than 50 rpm (condition 1) and the load variation is less than 5% (condition 2). And if the condition 1 or 2 is not satisfied, the value in the register D is cleared to zero in step P23, and the insignificant sequential correction quantity C relative to the previous running mode is also cleared to zero in step P24. Then the process jumps to step P25. If the conditions 1 and 2 are both satisfied, a numerical value 1 is added to the value stored in the register D in step P15, and the result is stored therein again. Subsequently in step P16, a check is executed to ascertain whether the value in the register D is 100 or not, i.e. whether 100 ignition cycles have passed or not while satisfying the conditions 1 and 2. In the case of $D \neq 100$ which is anterior to the renewal timing, the process jumps to P25. In another case of $D=100$, a check is executed in step P17 to ascertain whether the sequential correction quantity stored in the register C is zero or not. And if $C=0$, one unitary control quantity is subtracted in step P20 from the corrective control value retrieved in step P7 and stored temporarily in the register B, and the result is stored in the register B. If $C \neq 0$, the value in the register C is added in step P18 to the value in the register B, and the result is stored again in the register B. Subsequently in step P19, the sequential correction quantity stored in the register C is cleared to zero. In step P21, the value in the register B altered previously in step P18 or P20 is stored as a new corrective control value at a position corresponding to the present running mode in the learning map. The value in the register D is cleared to zero in step P22 so as to be ready for the next renewal of the learning map. In step P25, a desired advance angle for ignition is determined by computing the reference control value retrieved from the angular advance map in step P6 and stored in the register A, the corrective control value stored in the register B (or the value processed and renewed in steps P17 through P22), and also the sequential correction value stored in the register C. And in step P26, the advance angle determined in the preceding step P25 is converted into time data representing the lag from the position of the aforesaid reference crank angle pulse. The computation of such angle-to-time conversion can be executed with facility according to the information of the rotational speed obtained in step P3. The angular advance control quantity converted into the time in step P26 is preset in the counter of the timing converter 18 synchronously with the reference crank angle pulse and, when the content of the counter has reached zero after a lapse of the time corresponding to such angular advance control quantity, an ignition timing signal is produced at step P27 to interrupt energization of the ignition coil in the circuit 17, thereby igniting the engine.

The control operation in the embodiment of this invention is performed in the manner mentioned above. Differing from the conventional knock suppression apparatus where such suppression is executed unidirectionally by controlling the angular delay from the preset advance-angle point for ignition, the present invention is capable of correcting the preset advance angle for ignition in both leading and lagging directions. Therefore, with regard to the data in the angular advance map where reference advance angles for ignition are stored, optimal values thereof established at the time of designing the engine are stored, and further an initial value 0 is stored in each area of the learning map where corrective control values are stored, so that knock suppression control in the initial stage is started with reference to the design values, and knocking caused due to nonuniformity of individual engines or seasonal changes can be suppressed by the corrective control values to eventually eliminate the necessity of presetting the estimated knock suppression control range that has been required heretofore in the conventional apparatus, hence enhancing the controlling capabilities in the initial stage.

The ignition timing control apparatus according to the present invention further includes a function for halting renewal of a corrective control value in the direction of angular advance in case detection of knocking is rendered impossible by some reason as mentioned previously and then adding a proper value of angular delay. Such control action is executed in the following procedure described below with reference to FIG. 2. In response to an input abnormality signal, the microcomputer 20 halts its process for renewing the corrective control quantity as mentioned previously and adds an angular delay control value $\Delta R$, which corresponds to a delay angle of three degrees or so, to the corrective control value exceeding the knock threshold point in the preceding engine running mode and stored at the learning-map address corresponding to the present running mode, thereby obtaining an ignition-timing corrective control quantity. Subsequently, this control quantity is applied to correct the reference control value read out from the angular advance map, whereby the ignition timing is determined to ignite the engine. Thus, even when detection of induced knocking becomes impossible, renewal of the corrective control quantity can be brought to a halt and simultaneously a predetermined value of angular delay is added, hence preventing premature ignition with certainty.

Figure 4:
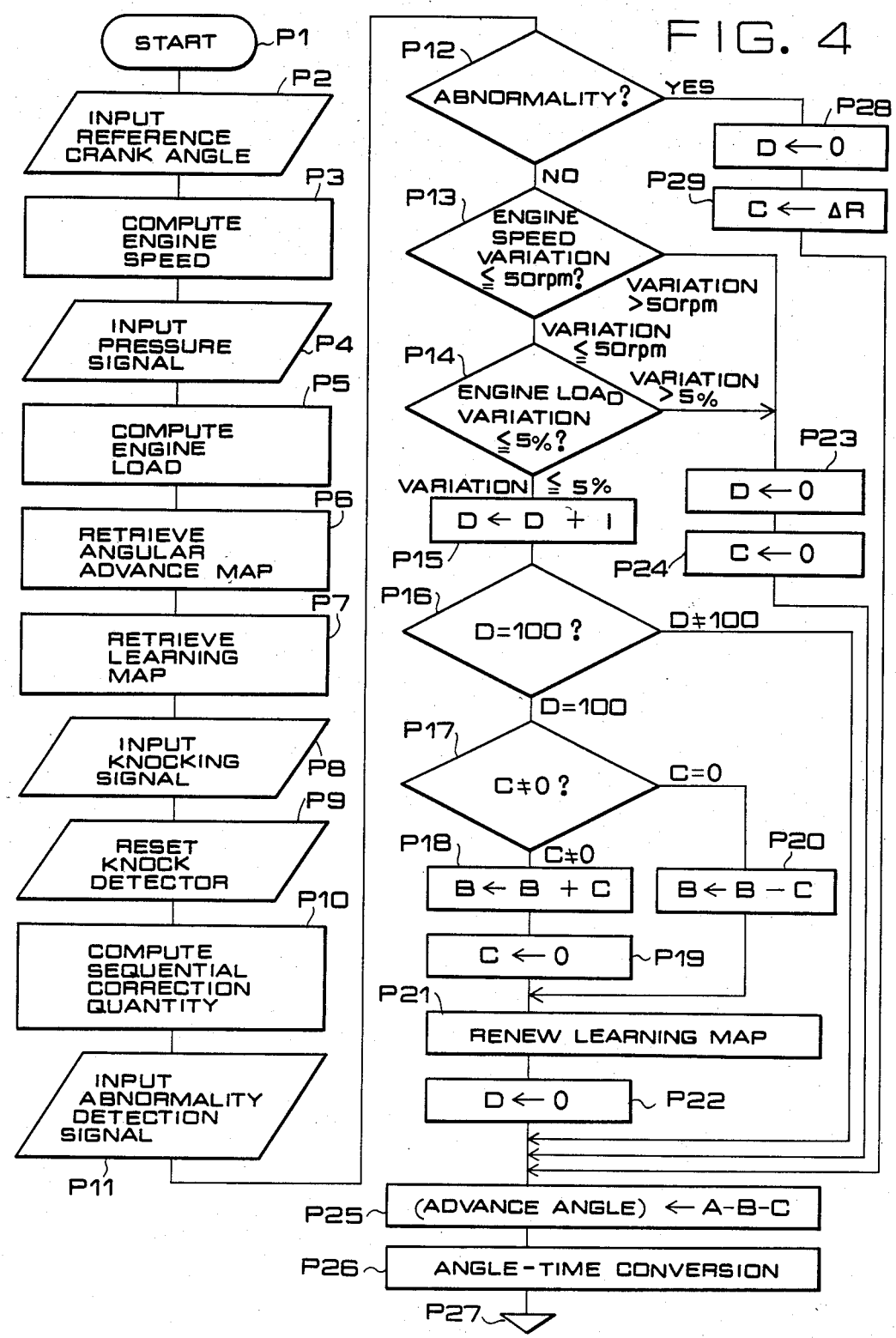
FIG. 4 is a flowchart representing the control operation of another embodiment.

The flowchart of FIG. 4 shows the operation of such ignition timing control apparatus so constituted as to add a proper value of angular delay. In FIG. 4, steps P1 through P27 are fundamentally equal to those shown in the aforesaid flowchart of FIG. 3 relative to the foregoing embodiment, and the difference resides merely in the addition of steps P28 and P29. When occurrence of any abnormality is detected in step P12, the value in the register D is cleared to zero in step P28. And subsequently in step P29, a control quantity $\Delta R$ corresponding to a proper angular delay is stored in the register C where a sequential correction value is stored, and then the aforesaid step P25 follows the above operation.

As described hereinabove, in a feedback control system for detecting knocks induced in an engine and generating a control signal in accordance with the detection output to suppress the knocks, the present invention has memory areas corresponding to the individual rotational speeds and load states of the engine, and corrective control values established for knock suppression in the individual running modes of the engine are stored in the memory areas respectively. And during the running of the engine, the corrective control value related to the running mode is read out from the memory area to control the knocking component. For any knock of a slight intensity generated during such control, a sequential correction value is added to the aforesaid corrective control value to carry out knock suppression control, thereby achieving satisfactory response in the knock suppression. In this manner, when sequential correction is executed for the induced knocking, the sequential correction value is added to the corrective control value at a predetermined cycle. Meanwhile, if no knocking is induced and the sequential correction value is zero, the corrective control value is reduced by a predetermined quantity at a predetermined cycle and is stored in the corresponding memory area to renew the corrective control value previously stored, thereby ensuring adequate response to any long-period variation of the knock-inducing factors. Furthermore, when there occurs a change in the engine running mode, undesired influence of insignificant knock suppression control for the stage anterior to and during such change is removed, so that the time lag in knock suppression is eliminated eventually to attain remarkable improvement in the knock suppression response.

In the meanwhile, means is provided for detecting an abnormality in the knock detector so as to keep monitoring the action of the knock detector. And upon occurrence of any abnormality, renewal of the corrective control value for knock suppression is prohibited immediately, thereby preventing premature ignition of the engine that may otherwise be caused due to renewal of the corrective control value in the ignition advancing direction as a result of failure in detecting a knocking signal. Consequently, it becomes possible to prevent disordered condition of the engine and harmful influence exerted thereon due to premature ignition, hence accomplishing safety in the running of the engine.

Furthermore, the ignition timing control apparatus of the present invention has another function which, at the occurrence of any abnormality in the knock detector, performs correction by adding a proper quantity of angular delay to the corrective control value for the engine running mode at that moment. Accordingly, ignition at any angle beyond the knock threshold point can be prevented to achieve certain elimination of various disadvantages that result from premature ignition.

What is claimed is:

1. An apparatus for controlling the timing of ignition in an engine, comprising:
    means for detecting knocking in the engine;
    means for computing a cumulative correction value from the detected knocking;
    a running mode sensor for detecting the running mode of the engine;
    means for producing a reference control value of the basis of a reference ignition timing characteristic corresponding to the running mode of the engine;
    memory means for storing corrective control values corresponding to the individual running modes of the engine and, in response to the information from said running mode sensor representative of one running mode, outputting the corrective control value corresponding to said information;

renewal control means operated after periods of steady running conditions extending over a plurality of ignition cycles for renewing the corrective control value in the memory means corresponding to the present running mode in accordance with the cumulative correction value so that said control value is changed in the direction of angular advance for ignition upon detection of no knocking and is changed in the direction of angular delay for ignition upon detection of knocking with a corresponding adjustment in the cumlative correction value;

means for computing an ignition-timing corrective control quantity according to the corrective control value read out from said memory means and the cumulative correction value;

timing converter means for determining the ignition timing on the basis of said ignition-timing corrective control quantity and said reference control valve; and abnormality detecting means capable of detecting occurrence of an abnormality in said knock detecting means and, upon detection of any abnormality, prohibiting said renewal control means for renewing the stored value.

2. The apparatus as defined in claim 1, wherein said running mode sensor consists of a crank angle sensor for producing a reference crank angle signal conforming to the rotation of said engine, and a pressure sensor for producing a pressure signal proportional to the suction pipe pressure in the engine.

3. The apparatus as defined in claim 1, wherein said knock detecting means consists of an acceleration sensor for detecting the acceleration of the engine vibration, and a knock detector for discriminating from the output of said acceleration sensor a signal component derived from knocking of the engine.

4. The apparatus as defined in claim 3, wherein said abnormality detecting means consists of a circuit for detecting an abnormality from the noise level of the output of said acceleration sensor.

5. The apparatus as defined in claim 1, further including a microcomputer which receives the respective outputs of said running mode sensor and said knock detecting means and feeds an output signal to said timing converter means.

6. An apparatus for controlling the timing of ignition in an engine, comprising:

means for detecting knocking in an engine;

means for computing a cumulative correction value from the detected knocking;

a running mode sensor for detecting the running mode of the engine;

means for producing a reference control value on the basis of a reference ignition timing characteristic corresponding to the running mode of the engine;

memory means for storing corrective control values corresponding to the individual running modes of the engine and, in response to the information from said running mode sensor representative of one running mode, outputting the corrective value corresponding to said information;

renewal control means operated after periods of steady running conditions extending over a plurality of ignition cycles for changing, in the direction of angular delay for ignition, the corrective control value corresponding to the present running mode by the cumulative correction value, and for resetting the cumulative correction value;

means for computing an ignition-timing corrective control quantity according to the corrective control value read out from said memory means and the cumulative correction value;

timing converter means for determining the ignition timing on the basis of said ignition-timing corrective control quantity and said reference control value; and abnormality detecting means capable of detecting occurrence of an abnormality in said knock detecting means and, upon detection of any abnormality, prohibiting said renewal control means for renewing the stored value; said control-quantity computing means including means which, upon detection of any abnormality by said abnormality detecting means, adds a predetermined quantity of angular delay to the corrective control value read out from said memory means and thereby computes the ignition-timing corrective control quantity.

* * * * *